United States Patent [19]
Kawakatsu et al.

[11] Patent Number: 5,576,958
[45] Date of Patent: Nov. 19, 1996

[54] FUNCTION TRANSFORM APPARATUS

[75] Inventors: Yasuhiro Kawakatsu; Akihiro Yamori; Kiichi Matsuda; Akira Nakagawa, all of Kawasaki, Japan

[73] Assignee: Fujitsu Limited, Kanagawa, Japan

[21] Appl. No.: 403,057

[22] Filed: Mar. 13, 1995

[30] Foreign Application Priority Data

Mar. 18, 1994 [JP] Japan ................... 6-049606

[51] Int. Cl.$^6$ .................................................. G06F 17/14
[52] U.S. Cl. .................................................. 364/725
[58] Field of Search ........................... 364/725, 726, 364/727

[56] References Cited

U.S. PATENT DOCUMENTS 5,345,408  9/1994  Hoogenboom .................. 364/725
5,361,220  11/1994  Asano ................................. 364/725
5,394,349  2/1995  Eddy ................................... 364/725

*Primary Examiner*—Paul P. Gordon
*Assistant Examiner*—Emmanuel L. Moise

[57] ABSTRACT

Frequently occurring DCT coefficients F(u, v) are predictable. Accordingly, values $f_{u,v,F(u,v)}(x, y)$ for the frequently occurring DCT coefficients are calculated and stored, in advance, in a table. Among input DCT coefficients F(u, v), only non-zero DCT coefficients are processed. It is determined whether or not the table contains values $f_{u,v,F(u,v)}(x, y)$ for a given non-zero DCT coefficient. If the table contains the values, they are read out of the table, and if not, they are directly calculated. The read or calculated values are added to pixels (x, y), respectively, to provide pixel values (x, y).

10 Claims, 21 Drawing Sheets

*$c(u,x) = C(u) \cos((2x+1)u\pi/16)$

LEFT PIXEL VALUE (13 BITS)   BUFFER AREA (6 BITS)   RIGHT PIXEL VALUE (13 BITS)

FUNCTION TRANSFORM APPARATUS

BACKGROUND OF THE INVENTION

1. Field of the Invention

The present invention relates to a function transform apparatus for transforming a function in one domain into a function in another domain, and particularly, to a two-dimensional inverse discrete cosine transform (I-DCT) apparatus which is used to reproduce an image from a two-dimensional discrete cosine transform (DCT) of the image.

2. Description of the Related Art

A two-dimensional discrete cosine transform (DCT) efficiently compresses and encodes image data. The DCT is widely adopted for encoding and compressing images in visual telephone systems based on ITU-T Recommendation H.261, dynamic images in MPEG (Moving Picture Experts Group) systems, and static images in JPEG (Joint Photographic Experts Group) systems. To decode the DCT-encoded images, a two-dimensional inverse discrete cosine transform (I-DCT) is used. The I-DCT changes a two-variable function in a frequency domain into a two-variable function in a positional variable domain. A microprocessor or a DSP must carry out the I-DCT at a high speed, to provide an inexpensive compact image decoder.

An example of a technique for speedily executing the I-DCT is a Chen algorithm, which carries out an 8-by-8 I-DCT operation with 416 additions and 256 multiplications.

A microprocessor or a DSP employing the Chen algorithm to carry out the I-DCT, however, does not have sufficient operation speed. The Chen algorithm is impractical to decode dynamic images because it provides an insufficient frame rate.

DCT-encoded data includes DCT coefficients for two-dimensional discrete vertical and horizontal spatial frequencies. The DCT coefficients are usually quantized to compress the data. Therefore, the DCT coefficients to be transmitted or stored have the following characteristics:

(1) When encoded at a compression ratio that secures a practical image quality, about 1/8 of the DCT coefficients are non-zero coefficients and the remaining 7/8 are zero.

(2) Most of the non-zero coefficients are around zero.

(3) Due to quantization, only certain coefficients, of the possible DCT coefficients, occur.

(4) DCT coefficients for two-dimensional spatial frequencies may be numbered in a zigzag manner in a two-dimensional plane and transformed into a one-dimensional sequence of numbers. The sequence of numbers is transformed into a combination of a zero run length indicating the length of consecutive zeroes and the level of a non-zero DCT coefficient that follows the consecutive zeroes, and such combinations are transmitted or stored.

The Chen algorithm may improve the operation speed of the I-DCT operation on general functions but it does not utilize the above-mentioned characteristics of DCT coefficients.

SUMMARY OF THE INVENTION

An object of the present invention is to provide a high-speed I-DCT apparatus that speedily decodes DCT-encoded and compressed data by effectively using the characteristics of the data.

In order to accomplish the object, the present invention provides a function transform apparatus for transforming a first function in the domain of first variables into a second function in the domain of second variables. The apparatus has a memory for storing a plurality of intermediate values corresponding to combinations of non-zero values of the first function, values of the first variables, and values of the second variables, a unit for determining whether or not a given value of the first function is zero, a unit for reading, out of the memory, intermediate values corresponding to combinations including the value of the first function that has been determined to be not zero and corresponding values of the first variables, and an accumulator for accumulating the read intermediate values with respect to each of values of the second variables, to provide values of the second function for the values of the second variables.

The first variables may be two-dimensional frequency variables, and the second variables may be two-dimensional positional variables. The first function may represent the two-dimensional discrete cosine transform of an image, and the second function may represent the image. A value of the first function may be a DCT coefficient, and a value of the second function may be a pixel value.

The present invention also provides a function transform apparatus for decoding an image encoded by a two-dimensional discrete cosine transform, wherein the encoded image includes combinations of non-zero DCT coefficients and zero run lengths. The apparatus has a memory for storing a plurality of intermediate values corresponding to combinations of non-zero DCT coefficients, values of two-dimensional frequency variables, and values of two-dimensional positional variables, a unit for finding values of the two-dimensional frequency variables corresponding to an input DCT coefficient according to an input zero run length, a unit for reading, out of the memory, intermediate values corresponding to combinations including the found values of the two-dimensional frequency variables and the DCT coefficient, and an accumulator for accumulating the read intermediate values with respect to each of the values of the two-dimensional positional variables, to provide pixel values corresponding to the two-dimensional positional variables.

DESCRIPTION OF THE PREFERRED EMBODIMENTS

Figure 1:
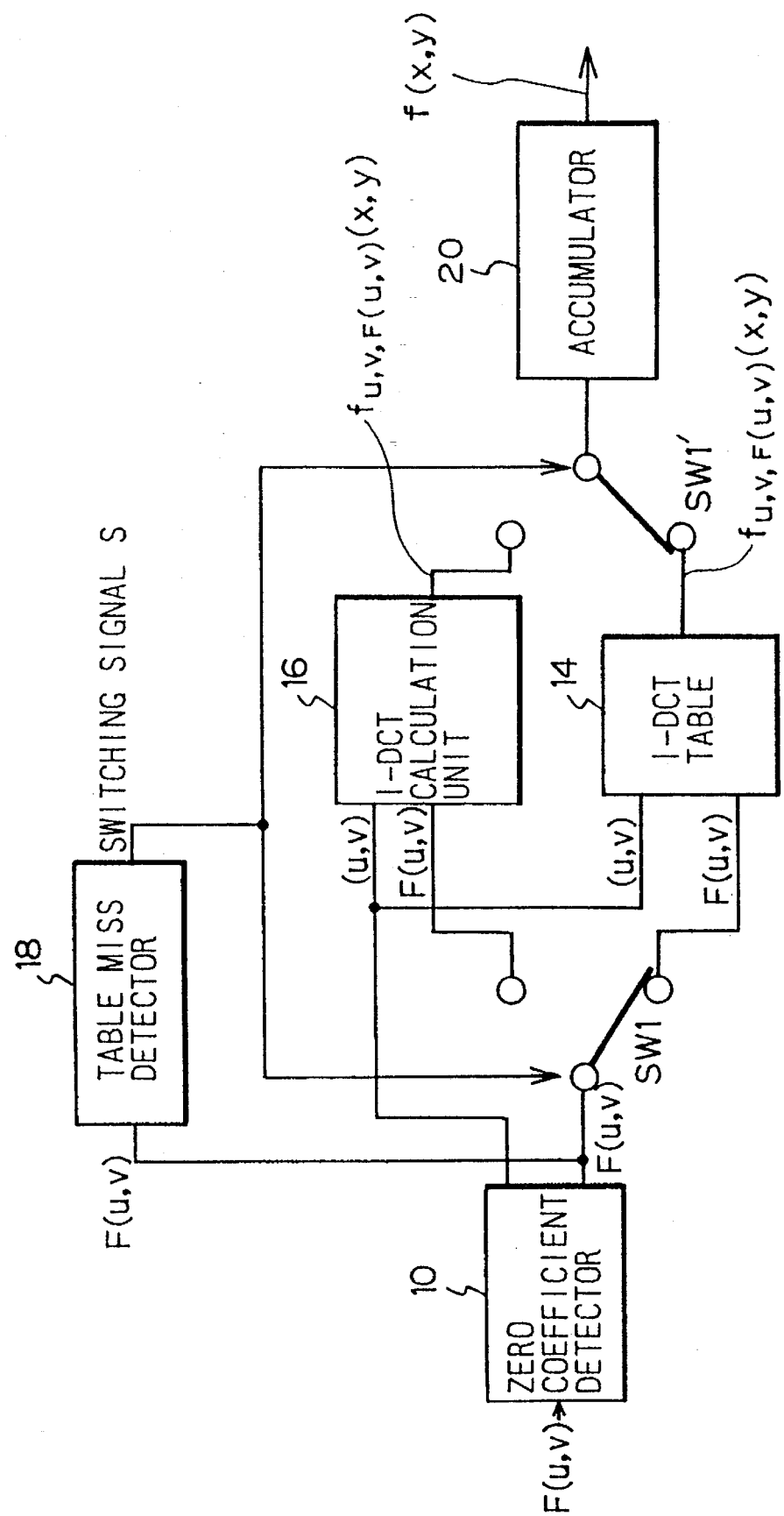
FIG. 1 is a block diagram showing an I-DCT apparatus according to an embodiment of the present invention.

According to ITU-T Recommendation H.261 and MPEG, an image is divided into blocks each consisting of 8×8 pixels. An encoder transforms pixel values $f(x, y)$ ($x, y=0, 1, 2, \ldots, 7$) in each of the blocks into DCT coefficients $F(u, v)$ ($u, v=0, 1, 2, \ldots, 7$), and a decoder transforms the DCT coefficients $F(u, v)$ into the pixel values $f(x, y)$. An I-DCT operation to carry out the above decoding is defined as follows:

$$f(x,y) = (1/4) \sum_{u=0}^{7} \sum_{v=0}^{7} f_{u,v,F(u,v)}(x,y) \quad (1)$$

$$f_{u,v,F(u,v)}(x,y) = \quad (2)$$
$$C(u)C(v)F(u,v)\cos[\pi(2x + 1)u/16]\cos[\pi(2y + 1)v/16]$$

$$C(u), C(v) = 1 (\text{for } u,v \neq 0), 1/\sqrt{2} \text{ (for } u,v = 0) \quad (3)$$

According to the expression (2), any combination of u and v that makes $F(u, v)=0$ provides $f_{u,v,F(u,v)}(x, y)=0$, which never affects $f(x, y)$ in the expression (1). Accordingly, an operation speed is improved by executing the expression (1) only on each combination of u and v that makes $F(u, v)\neq 0$.

Most of the DCT coefficients $F(u, v)$ are around zero, and those that are not around zero rarely occur, as mentioned above. Accordingly, values provided by the expression (2) may be calculated in advance for the DCT coefficients around zero and stored in a table. Only when a coefficient that is not listed in the table is provided, is the expression (2) is calculated for the coefficient.

It is impossible to make a table large enough to contain all possible coefficients because it needs a large memory capacity. Since the number of frequently occurring coefficients is limited, it is possible to store all of the frequently occurring coefficients in a memory of practical capacity.

Figure 2:
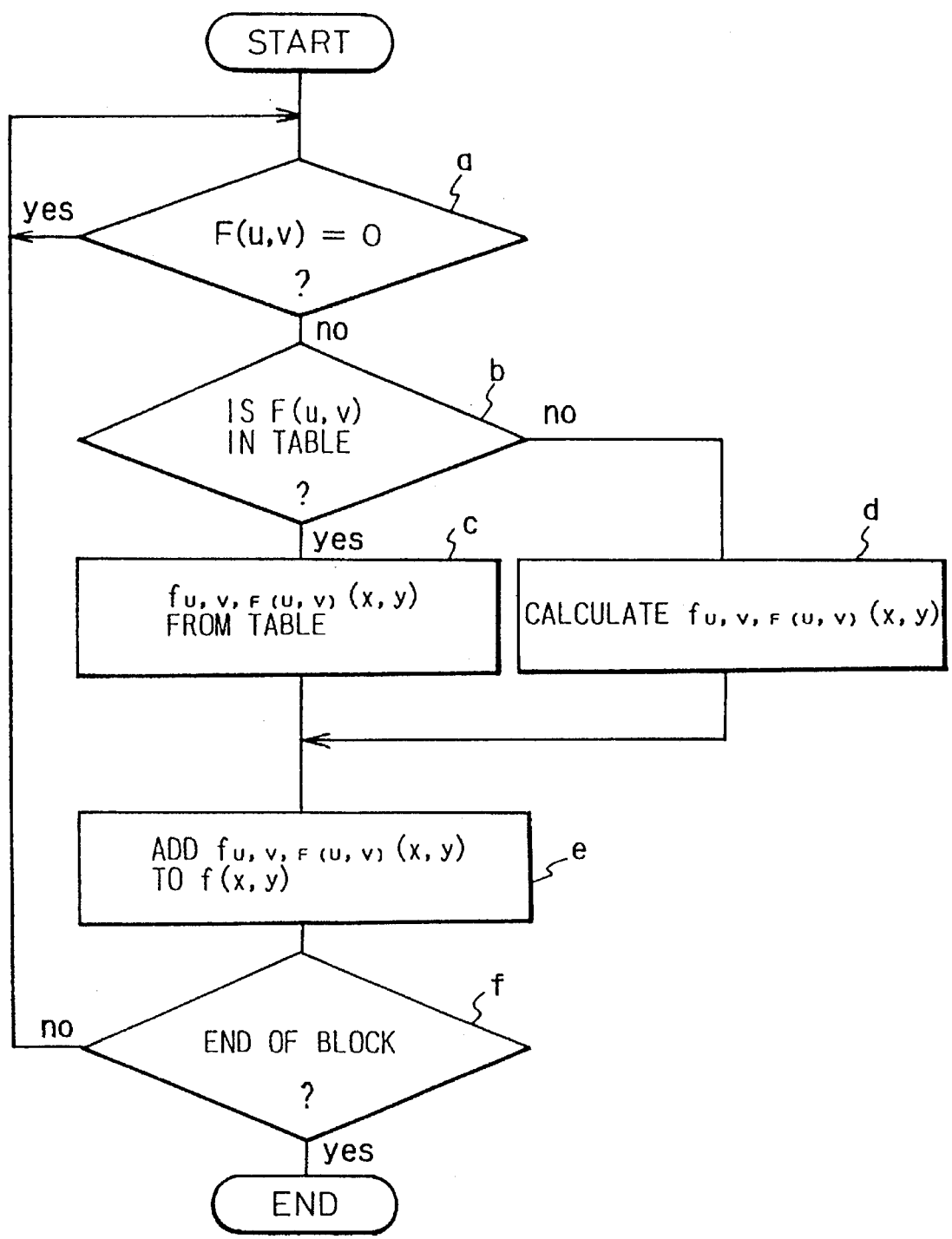
FIG. 2 is a flowchart showing the operation of the apparatus of FIG. 1.

FIG. 1 shows an I-DCT apparatus according to an embodiment of the present invention, and FIG. 2 shows the operation thereof. An I-DCT table 14 stores values $f_{u,v,F(u,v)}(x, y)$ calculated according to the expression (2) for combinations of $F(u, v)$ that are predicted to frequently occur and all of u, v, x, and y. When a combination of $F(u, v)$, u, and v is supplied as an address to access the table, the table provides $f_{u,v,F(u,v)}(x, y)$ for all values of x and y. An I-DCT calculation unit 16 calculates $f_{u,v,F(u,v)}(x, y)$ for all values of x and y from an input combination of $F(u, v)$, u, and v according to the expression (2).

The DCT coefficients $F(u, v)$, u, and v of a given block are supplied to a zero coefficient detector 10. For each of the input DCT coefficients $F(u, v)$, the zero coefficient detector 10 determines in step a of FIG. 2 whether $F(u, v)\neq 0$. Each combination of u, v, and $F(u, v)$ that satisfies $F(u, v)\neq 0$ is further processed. Namely, in step b of FIG. 2, a table miss detector 18 determines, for each such combination of u, v, and $F(u, v)$, whether or not values $f_{u,v,F(u,v)}(x, y)$ corresponding to the combination are stored in the I-DCT table 14 and provides a switching signal S to change switches SW1 and SW1'. The switches SW1 and SW1' are changed to lower contacts if the corresponding values are stored in the I-DCT table 14, and if not, to upper contacts. When the table 14 contains the corresponding values $f_{u,v,F(u,v)}(x, y)$, the table 14 provides them to an accumulator 20 in step c of FIG. 2. If the table 14 does not contain the values, the I-DCT calculation unit 16 calculates the values $f_{u,v,F(u,v)}(x, y)$ for the block and provides them to the accumulator 20 in step d. The accumulator 20 cumulatively adds the values $f_{u,v,F(u,v)}(x, y)$ to pixel values (x, y) of the block, respectively, in step e. When step f determines that every DCT coefficient $F(u, v)$ of the block has been processed, the accumulator 20 provides results $f(x, y)$ of the I-DCT operation.

The operation speed of the I-DCT calculation unit 16 is very slow compared with the speed of looking up the I-DCT table 14. Most of DCT coefficients, however, are processed with the switches SW1 and SW1' at the lower contacts, so that the total processing speed of the present invention is high. In addition, most of the DCT coefficients are zero, and therefore, the zero coefficient detector 10 provides about ⅛ of DCT coefficients as non-zero coefficients in each block, i.e., only about 8 non-zero coefficients in an 8-by-8-pixel block, to achieve a high-speed operation. For an 8-by-8 pixel block, the present invention carries out 64 additions on each DCT coefficient if the I-DCT table 14 contains $f_{u,v,F(u,v)}(x, y)$ corresponding to the DCT coefficient. If a given block contains eight non-zero coefficients and if all of them are found in the table 14, the present invention processes the block with 64×8=512 additions. On the other hand, the Chen algorithm must carry out 416 additions and 256 multiplications for processing the same block. If an addition and a multiplication take the same processing time, the Chen algorithm needs 672 additions for processing the block, so that the present invention is faster than the Chen algorithm.

Figure 3:
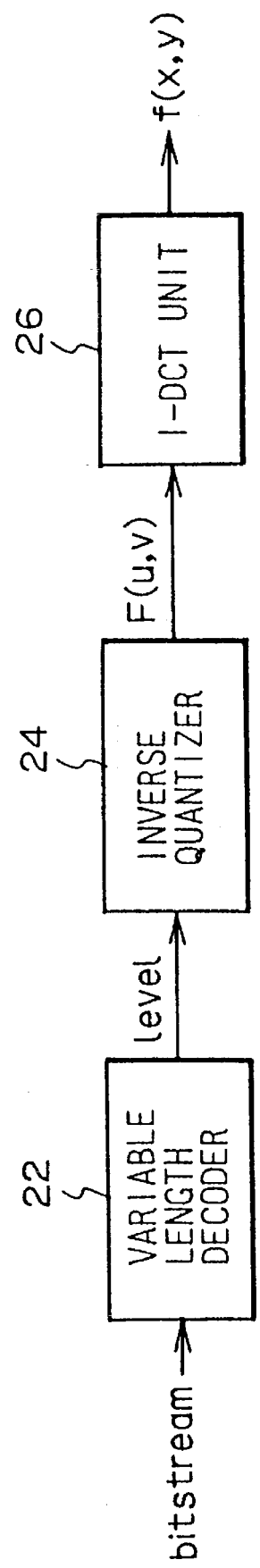
FIG. 3 is a block diagram showing an MPEG decoder according to the present invention.

FIG. 3 shows an MPEG decoder according to the present invention. For the sake of simplicity of explanation, this decoder processes only I images. A variable length decoder 22 receives a variable-length-encoded bit stream and converts it into DCT coefficient levels. An inverse quantizer 24 inverse-quantizes the DCT coefficient levels by multiplying them by quantization step sizes and provides DCT coefficients $F(u, v)$. An I-DCT unit 26 transforms the DCT coefficients $F(u, v)$ into pixel values $f(x, y)$.

Figure 4:
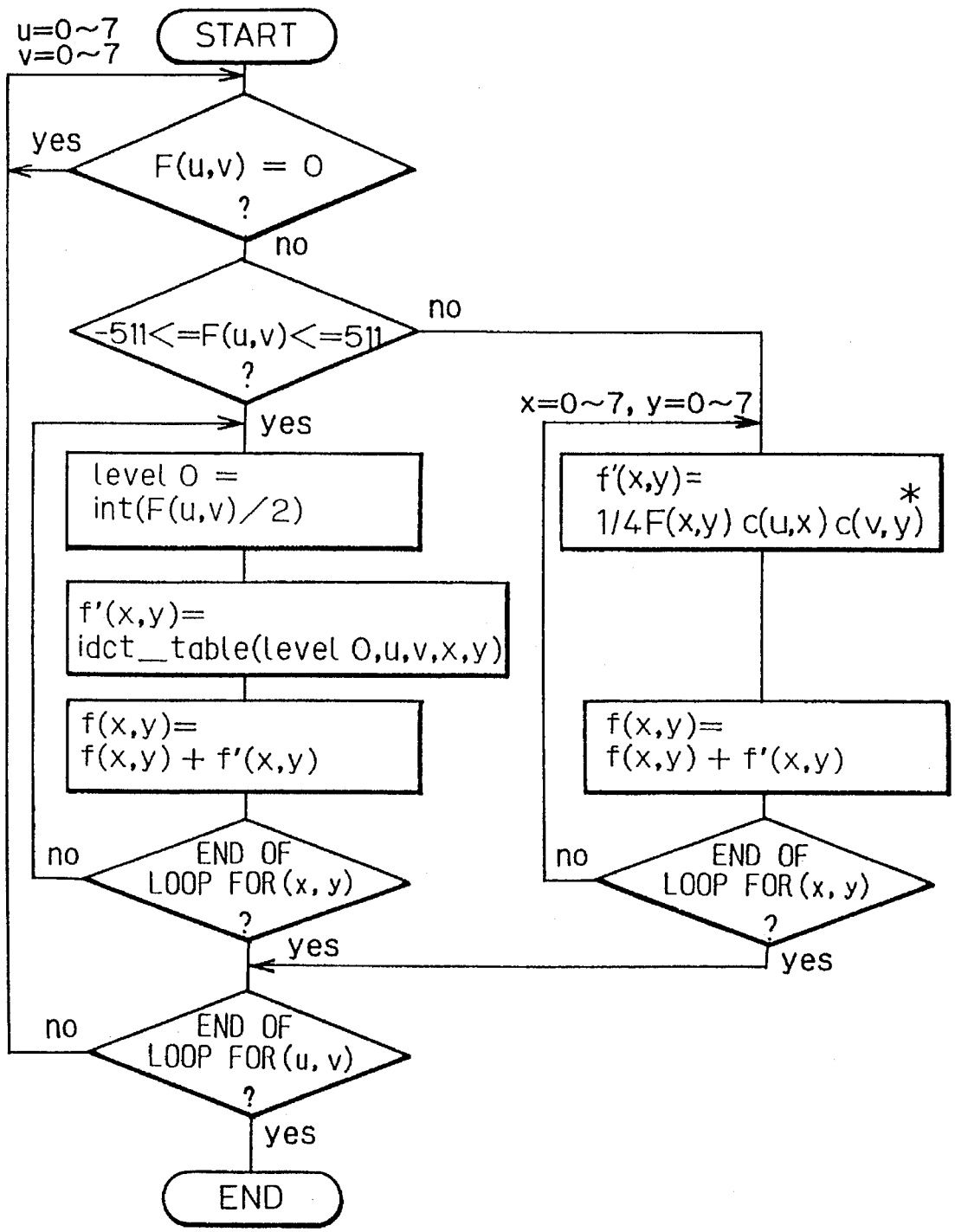
FIG. 4 is a flowchart showing the operation of the MPEG decoder of FIG. 3.

FIG. 4 is a flowchart showing the operation of the I-DCT unit 26. Namely, FIG. 4 shows the details of the flowchart of FIG. 2.

An I-DCT operation is carried out with 16-bit fixed-point calculations. A table idct_table(level0, u, v, x, y) is defined as follows:

idct_table(level0, u, v, x, y)=(¼)(level0*2+1)c(u, x)c(v, y)

where $0 \leq u, v, x, y \leq 7$, $-255 \leq level0 \leq 255$, and $c(u, x) = C(u)\cos((2x+1)u\pi/16)$.

The size of this table is (the number of values of u)×(the number of values of v)×(the number of values of x)×(the number of values of y)×(the number of values of level0)× (the number of bytes of data=2)=4194304 bytes. This size of table is achievable in a personal computer.

DCT coefficients provided by inverse quantization specified by MPEG are odd numbers equal to or larger than 3. Accordingly, entries of the table may be limited to odd numbers equal to or greater than 3. According to this embodiment, the level0 is as follows:

level0=int(F(u, v)/2)

where int(x) is a truncation of x to an integer. The level0 is used to look up the table, to make the size of the table half of a table that contains all DCT coefficients. According to this embodiment, $-255 \leq level0 \leq 255$, so that a table miss is determined as follows:

if ($-511 \leq F(u, v) \leq 511$)

then within table else out of table
According to this condition, about 90% or more of the DCT coefficients of an encoded image are within the table.

Figure 5:
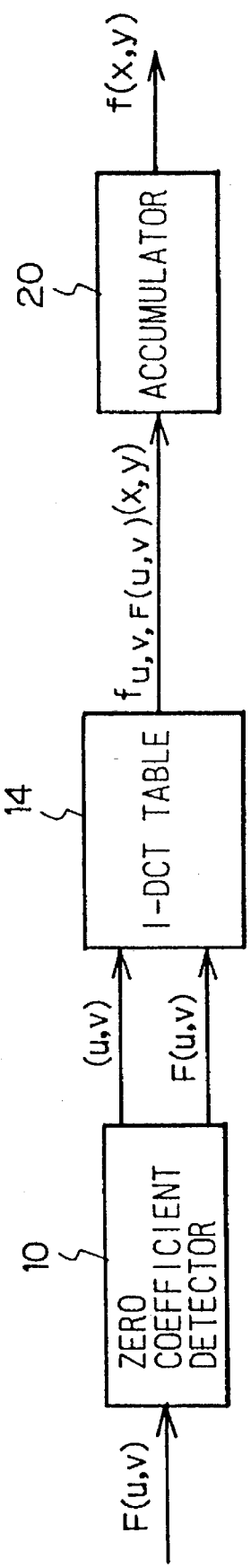
FIG. 5 is a block diagram showing an I-DCT apparatus according to another embodiment of the present invention.
Figure 6:
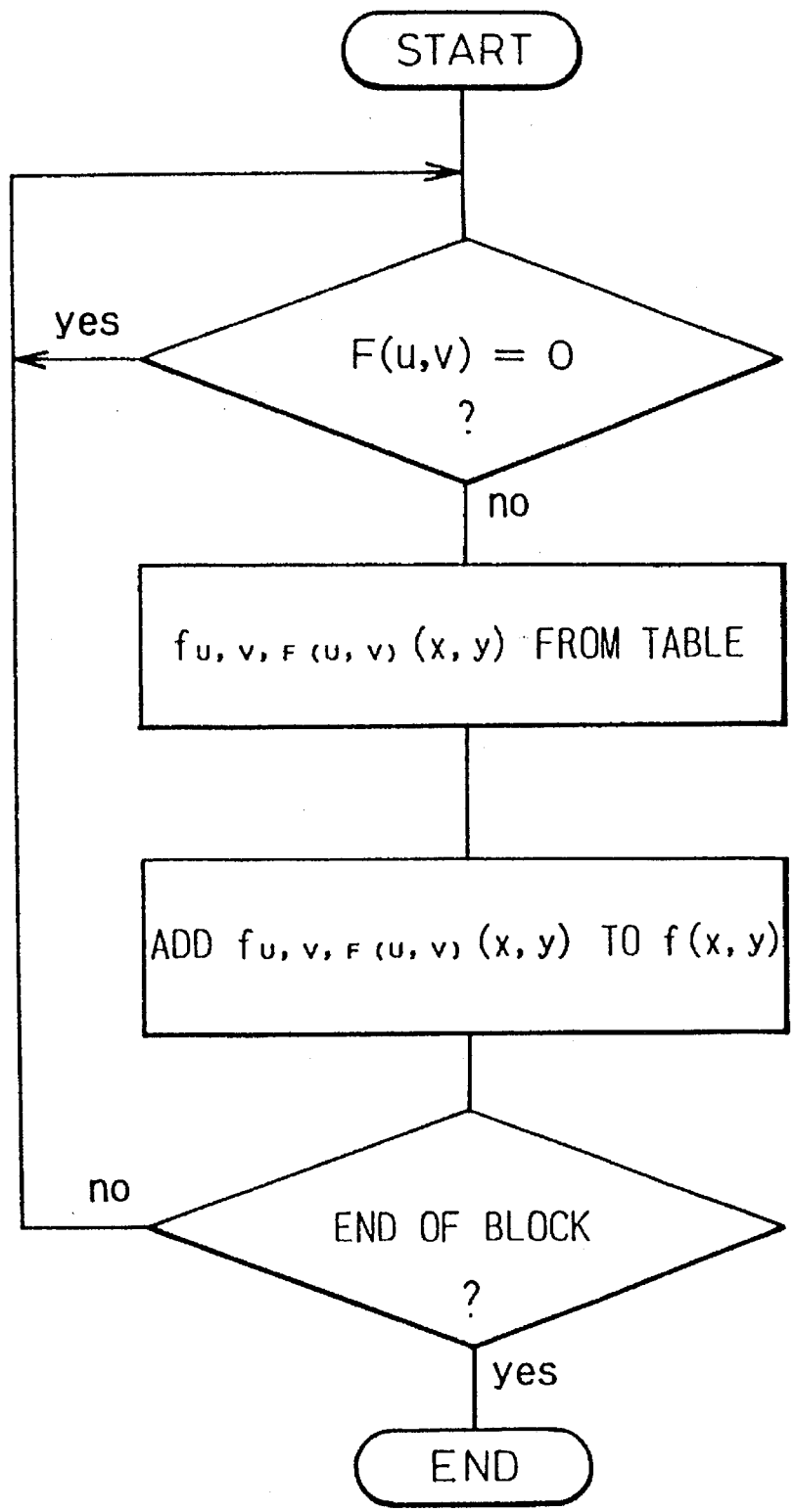
FIG. 6 is a flowchart showing the operation of the apparatus of FIG. 5.

FIG. 5 shows an I-DCT apparatus according to another embodiment, and FIG. 6 shows the operation thereof. The same reference marks as those of FIG. 1 represent like elements. The I-DCT apparatus of FIGS. 5 and 6 corresponds to that of FIGS. 1 and 2 except that the process is carried out when values corresponding to an input DCT coefficient F(u, v) are not found in the table. Namely, the embodiment of FIGS. 5 and 6 is the same as the embodiment of FIG. 1 with the switches SW1 and SW1' of FIG. 1 being fixed to the lower contacts. The embodiment of FIGS. 5 and 6 is applicable when a value for a quantizer is limited so that the possible number of coefficients is small and all of the coefficients are stored in the I-DCT table 14.

Figure 7:
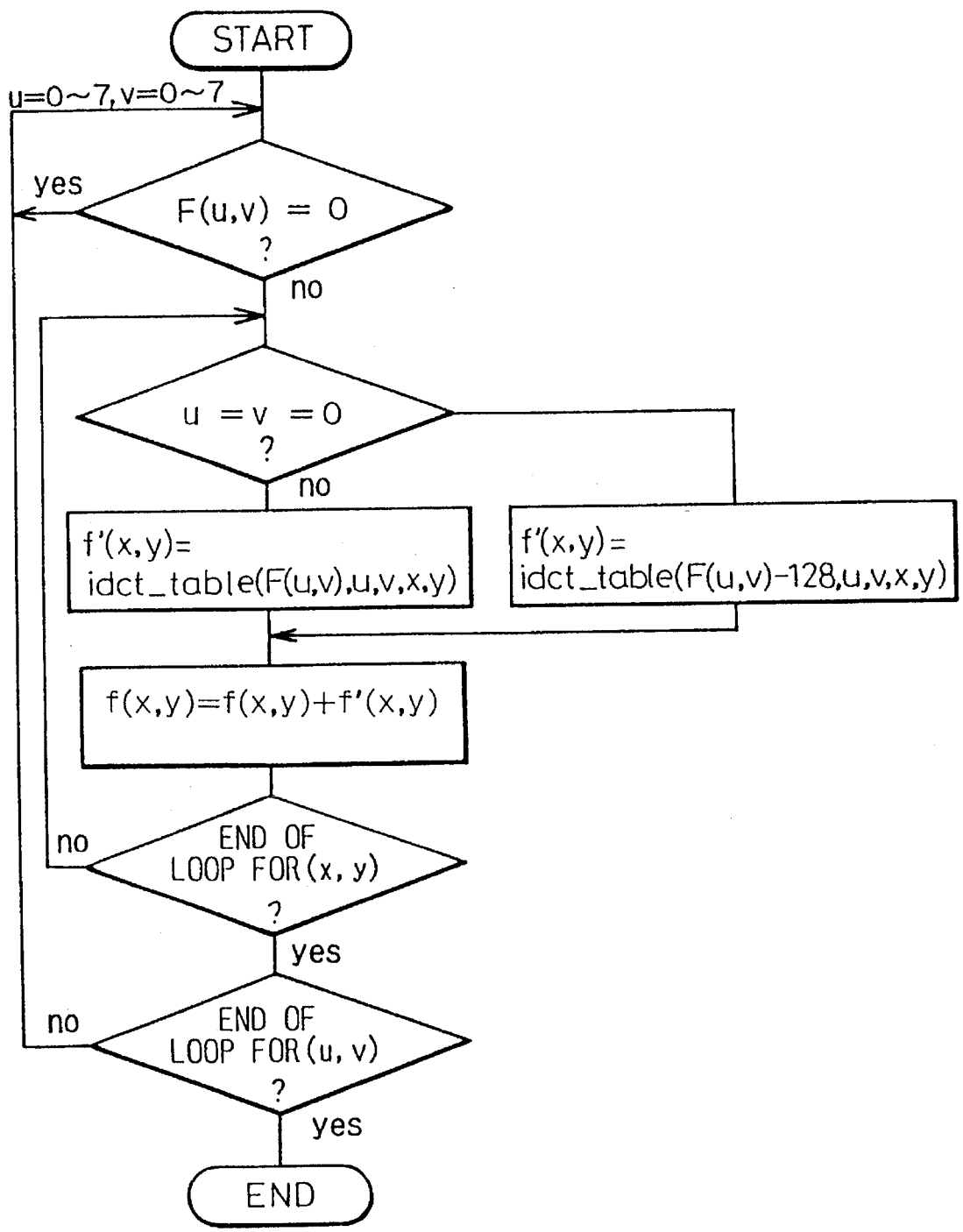
FIG. 7 is a flowchart showing the operation of another MPEG decoder according to the present invention.

FIG. 7 is a flowchart showing the operation of the MPEG decoder of FIG. 3 employing the embodiment of FIGS. 5 and 6. For the sake of simplicity of explanation, this example restores only I images and employs a quantizer that uses only 8.

An I-DCT operation is carried out with 16-bit fixed-point calculations. A table idct_table(level, u, v, x, y) is defined as follows:

idct_table(level, u, v, x, y)= (¼)*coef*c(u, x)c(v, y)

where $0 \leq u, v, x, y \leq 7$, $-128 \leq level \leq 127$, and $c(u, x) = C(u)\cos((2x+1)u\pi/16)$. The value of coef is obtained from the outputs level, u, and v of the variable length decoder 22 of FIG. 3 as follows:

When u=v=0:

coef=(level+128)*8

Other cases:

coef0=(2*8*level*intra_q_matrix(u,v))/16 if (coef is even and coef>0)

then coef=coef0−1
else if (coef is even and coef<0)
then coef=coef0+1
else coef=coef0 where intra_q_matrix(u, v) is an intra-macrobook quantization matrix specified by MPEG.

The size of the table is (the number of values of u)×(the number of values of v)×(the number of values of x)×(the number of values of y)×(the number of values of level)×(the number of bytes of each piece of data=2)=2097152 bytes. This size of table is realizable in a personal computer. Since the quantizer is limited to 8, this table contains all coefficients to occur.

Except u=v=0, the process of finding "coef" from "level" is completely equal to an inverse quantization process specified by MPEG. Accordingly, the inverse quantizer 24 of FIG. 3 actually carries out no process and provides a level decoded by the variable length decoder 22 as it is as F(u, v) to the I-DCT unit 26. According to the F(u, v), the I-DCT unit 26 looks up the table idct_table. When u=v=0, the table is looked up according to level−128.

The embodiments mentioned above calculate the expression (1) for each of x and y, to calculate pixel values f(x, y). A 32-bit microprocessor in which a word is composed of 32 bits is capable of handling 32-bit information with one instruction. Namely, the 32-bit microprocessor is capable of carrying out a 32-bit addition in one time. On the other hand, $f_{u,v,F(u,v)}(x, y)$ of the expression (2) is expressed with about 13 bits. Accordingly, $f_{u,v,F(u,v)}(x, y)$ calculated from the same u, v, and F(u, v) and different (x, y) are stored in different bit areas in one word, to simultaneously carry out cumulative additions for different pixels with one instruction. This technique improves the operation speed.

In the following explanation, an instruction handles n-bit data. A register reg(x, y) to accumulate results of calculations of the expression (1) has the format shown in FIG. 8. This format involves n bits that pack nd pieces of ld-bit pixel data. A buffer area of ceil($\log_2(M \times M-1)$) bits is arranged between adjacent data areas. Here, M is the number of pixels along a side of a block, and ceil(x) is the raising of x to the nearest integer. Any combinations of nd pixels packed in the format may be possible as far as all of pixels are packed. For example, consecutive nd pixels in a direction x may be packed in the format.

Figure 8:
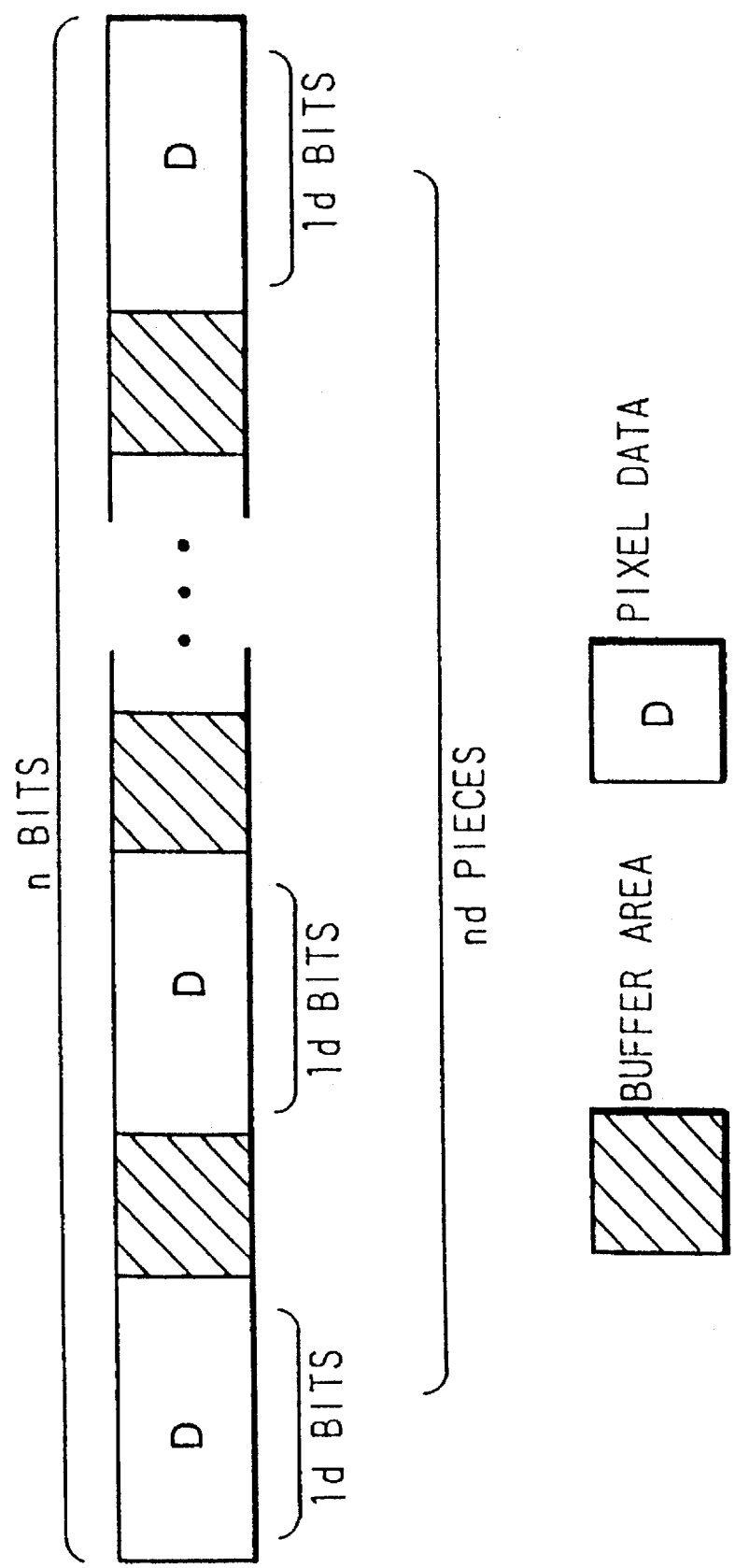
FIG. 8 is a diagram showing the format of a word stored in an accumulation register and in a table.

An I-DCT table prepared in advance must also employ the format of FIG. 8. Each buffer area contains zero. The expression (1) is simultaneously carried out on the nd pixels by accumulating corresponding values read out of the table. The number of additions for one DCT coefficient is ceil(M×M/nd) instead of M×M needed by the prior art that does not carry out the packing. Accordingly, the embodiment realizes a high-speed operation.

The reason why the buffer areas must be arranged will be explained. If values read out of the table are all positive values, the buffer areas are not necessary. Actually, however, there are some negative values to cause a carry after additions. To absorb carries, a buffer area is arranged between two adjacent pieces of data. Each bit of the buffer area is set to zero. In the case of an 8-by-8 two-dimensional DCT, the first addition is a simple substitution, so that the total of cumulative additions will be 63 at the maximum. Accordingly, there is a possibility of causing 63 carries, to generate a resultant value of 63 at the maximum. To absorb the carries, each buffer area will be ceil($\log_2(8 \times 8-1)$) bits=6 bits. Generally, M-by-M blocks need buffer areas each of ceil($\log_2(M \times M-1)$) bits.

Figure 9:
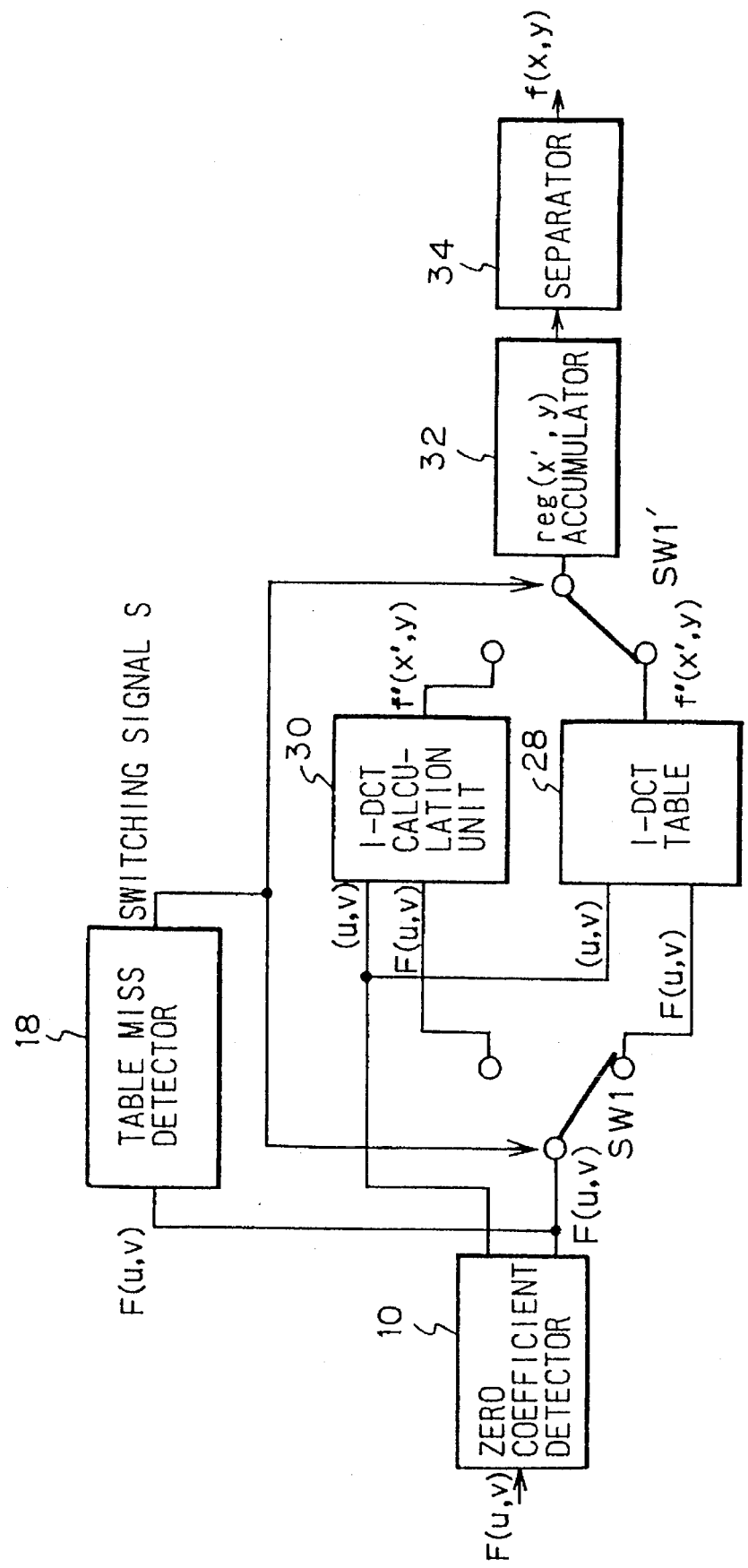
FIG. 9 is a block diagram showing an I-DCT apparatus according to still another embodiment of the present invention.

FIG. 9 shows an I-DCT apparatus according to still another embodiment of the present invention employing the idea mentioned above, and FIG. 10 shows the operation thereof. A zero coefficient detector 10 receives DCT coefficients F(u, v) for a given block. The zero coefficient detector 10 finds, in step a of FIG. 10, each non-zero coefficient F(u, v)≠0 and sends each set of u, v, and F(u, v) of each non-zero coefficient F(u, v)≠0 to the following process units. In step b, a table miss detector 18 determines whether or not an I-DCT table 28 contains values corresponding to the u, v, and F(u, v) and provides a switching signal S to control switches SW1 and SW1'. When the corresponding values are in the I-DCT table 28, the switches SW1 and SW1' are set to the lower contacts, and if not, to the upper contacts. If the corresponding values are in the I-DCT table 28, step c reads the values ($f_{u,v,F(u,v)}(x, y)$) for the block in question out of the table and provides them as f'(x', y) in the format shown in FIG. 8 to an accumulator 32. If it is not in the table, an I-DCT unit 30 calculates the values ($f_{u,v,F(u,v)}(x, y)$) for the block and packs them in the format of FIG. 8 and supplies them as f'(x', y) to the accumulator 32 in step d. The accumulator 32 cumulatively adds the values f'(x', y) to a register reg(x', y) for each pixel group in the accumulator 32 in step e. When step f determines that the DCT coefficients F(u, v) of the block have been completely processed, the registers reg(x', y) of the accumulator 32 provide the I-DCT results of the pixels of the block. Each register reg(x', y) stores effective data in the format of FIG. 8. Accordingly, a separator 34 separates the contents of the registers reg(x', y) pixel by pixel, to provide pixel values f(x, y) in step g.

Figure 10:
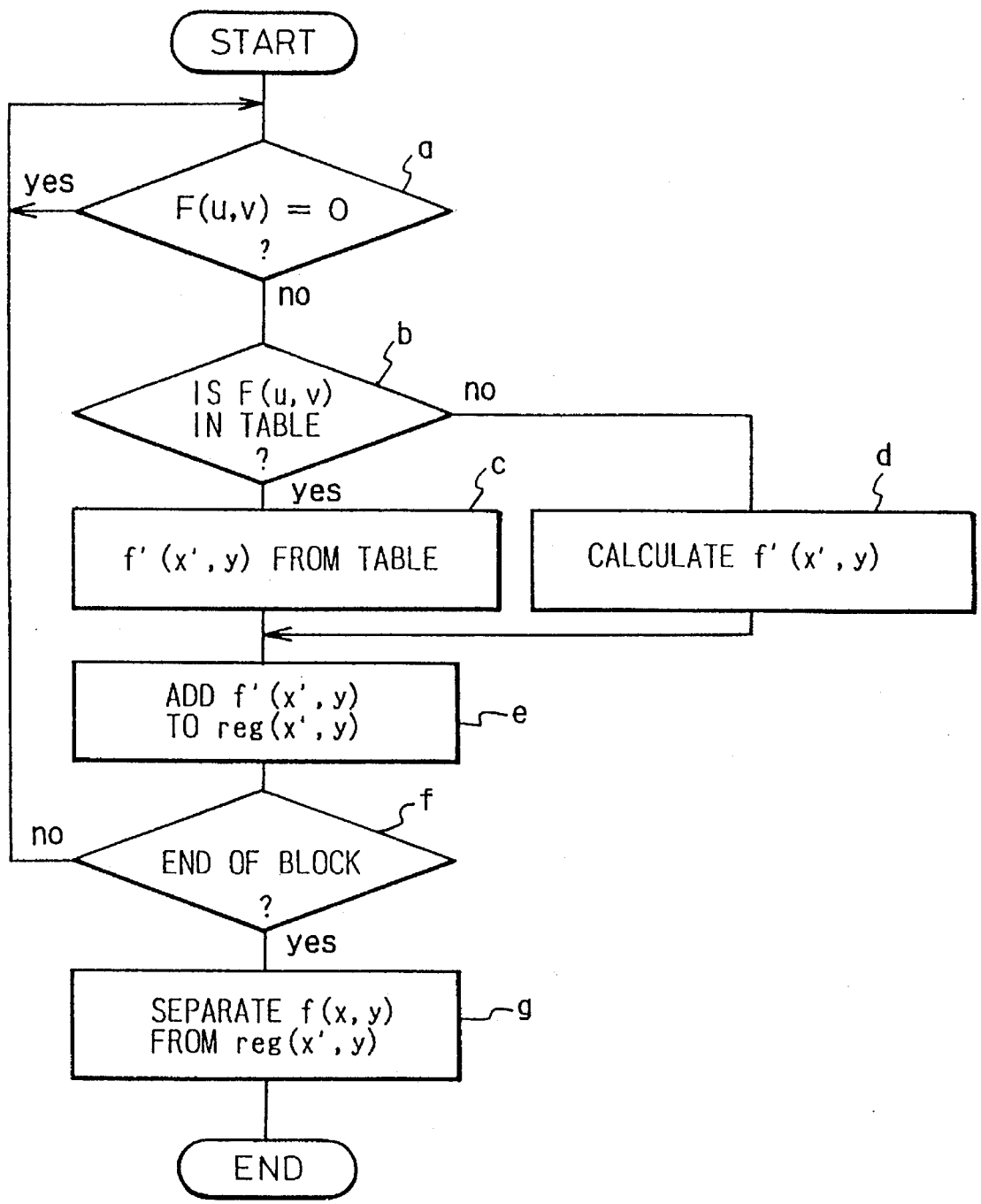
FIG. 10 is a flowchart showing the operation of the apparatus of FIG. 9.
Figure 11:
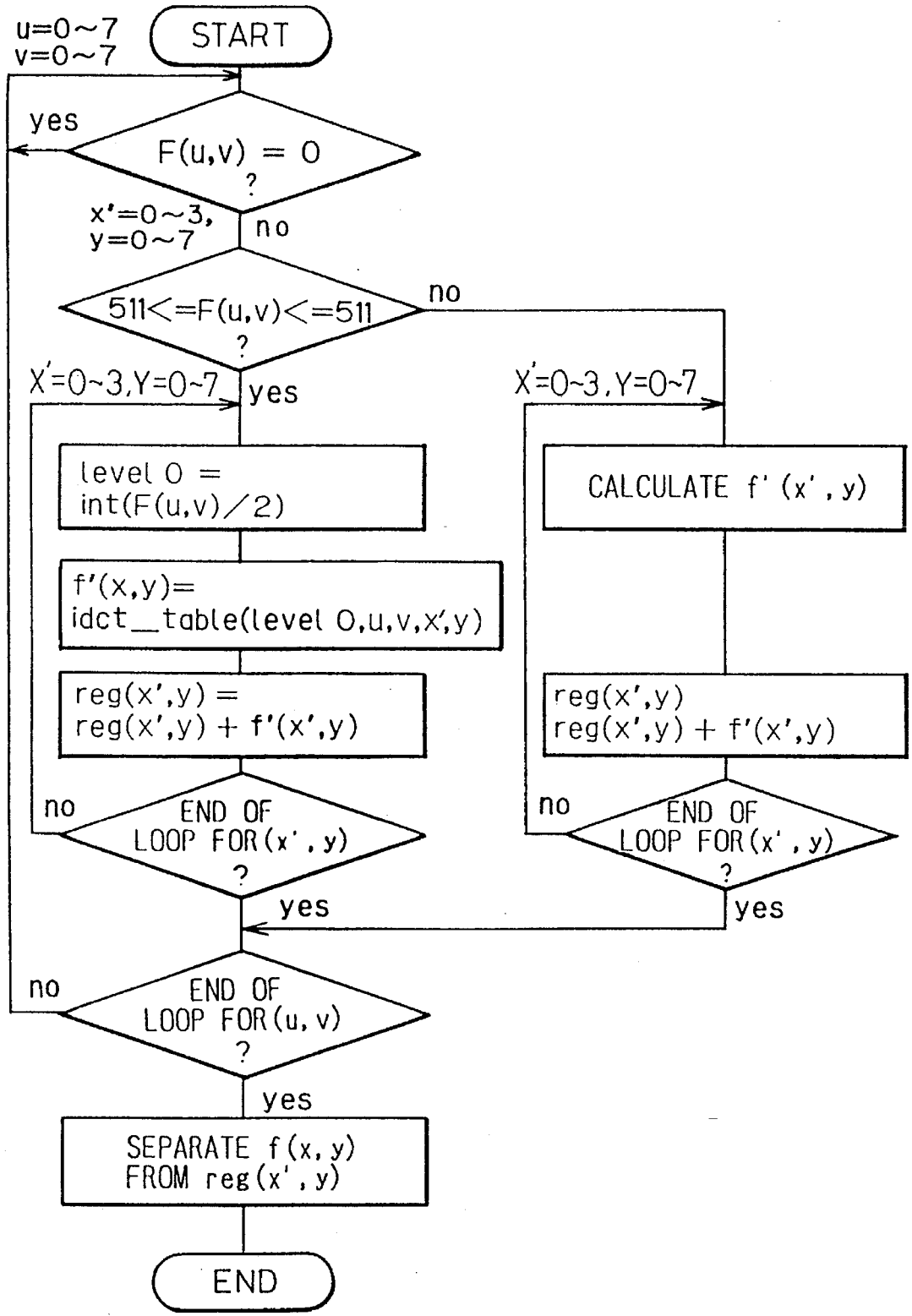
FIG. 11 is a flowchart showing the operation of still another MPEG decoder according to the present invention.

FIG. 11 shows the MPEG decoder of FIG. 3 adopting the I-DCT apparatus of FIGS. 8 to 10 realized as a 32-bit CPU. For the sake of simplicity of explanation, the decoder of this example handles only I images.

Figure 12:
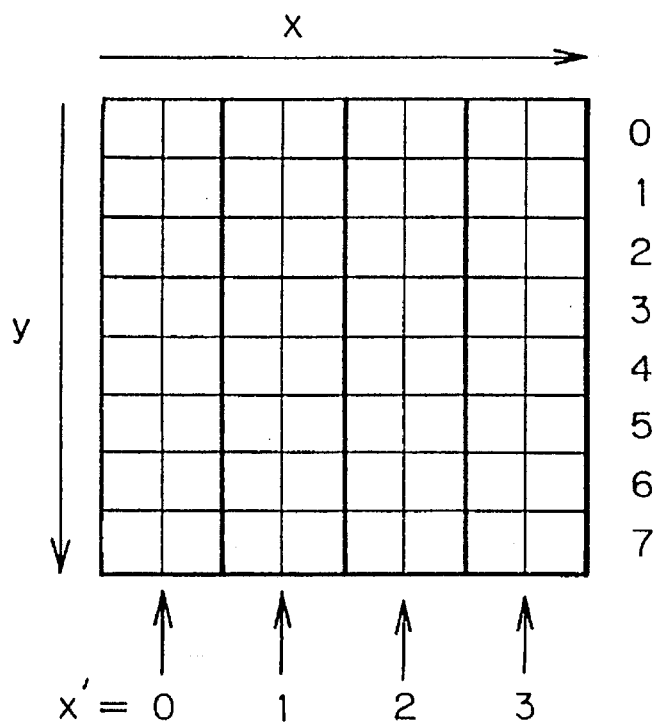
FIG. 12 is a diagram showing an example of grouped pixels.
Figure 13:
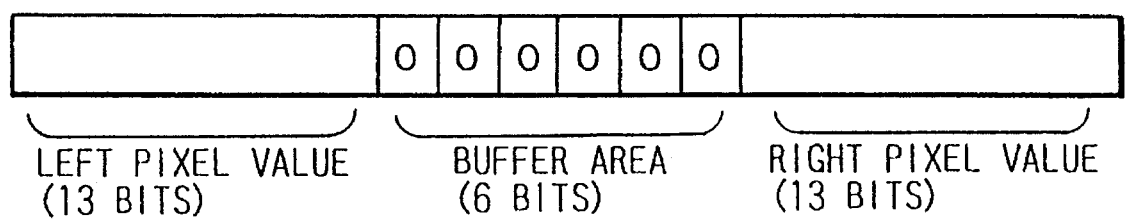
FIG. 13 is a diagram showing an example of the format of a word stored in an accumulation register and in a table.

The MPEG specifies an 8-by-8 two-dimensional I-DCT operation. This operation involves 8×8=64 input DCT coefficients F(u, v), and 8×8=64 output pixel values f(x, y). As shown in FIGS. 12 and 13, this embodiment packs two pixels, that are adjacent to each other in a direction x, into 32-bit data and processes the data. A frame encircled by a thick line corresponds to one piece of data that corresponds to an accumulation register reg(x', y). There are 32 pieces of data. A thin line is a border between adjacent pixels.

A table idct_table(level, u, v, x', y) will be explained. When the table has no corresponding data for F(u, v), the same operation explained below will be carried out with 13-bit fixed-point accuracy (with two bits below a decimal point).

$$idct\_table(level0, u, v, x', y)=int(f_{u,v}(level0\times2+1, 2x', y)\times4)\&0x1fff<<19|int(f_{u,v}(level0\times2+1, 2x'+1, y)\times4)\&0x1fff$$

where $0\leq x'\leq 3$, $0\leq u, v, y\leq 7$, $-255\leq level0<255$, $$f_{u,v}(level0, x, y)=C(u)C(v)\times level0\times \cos[(2x+1)u\pi/16]\cos[(2y+1)v\pi/16]$$

in which int( ) is a truncation operation to an integer, & is an AND operation, | is an OR operation, 0x is a hexadecimal expression, and <<x is an x-bit left shift operation.

Data separation is carried out as follows:

$$f(2x', y)=(reg(x', y)>>19)\&0x1fff$$

$$f(2x'+1, y)=reg(x', y)\&0x1fff$$

where >>x indicates an x-bit right shift operation.

The size of this table is (the number of values of u)×(the number of values of v)×(the number of values of x')×(the number of values of y)×(the number of values of level 0)×(the number of bytes of one word=4)=4194304 bytes. This size of table is realizable in a personal computer.

According to the MPEG, DCT coefficients obtained by inverse quantization are only odd numbers equal to or larger than 3. Accordingly, the entries of the table may be limited to odd numbers equal to or larger than 3. According to this embodiment, the following is established:

$$level0=int(F(u, v)/2)$$

where int(x) is a truncation of x to an integer. The level0 is used to look up the I-DCT table, to make the size of the table half of a table that contains all DCT coefficients. According to this embodiment, $-255\leq level0\leq 255$, so that a table miss is determined as follows:

if $(-511\leq F(u, v)\leq 511)$ then within table else out of table

According to this condition, about 90% or more of the DCT coefficients of an encoded image are within the table.

Figure 14:
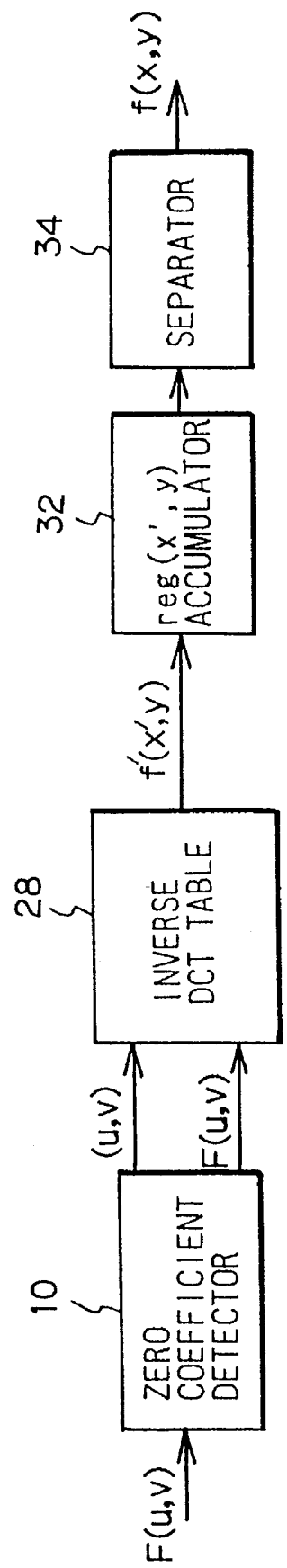
FIG. 14 is a block diagram showing an I-DCT apparatus according to still another embodiment of the present invention.
Figure 15:
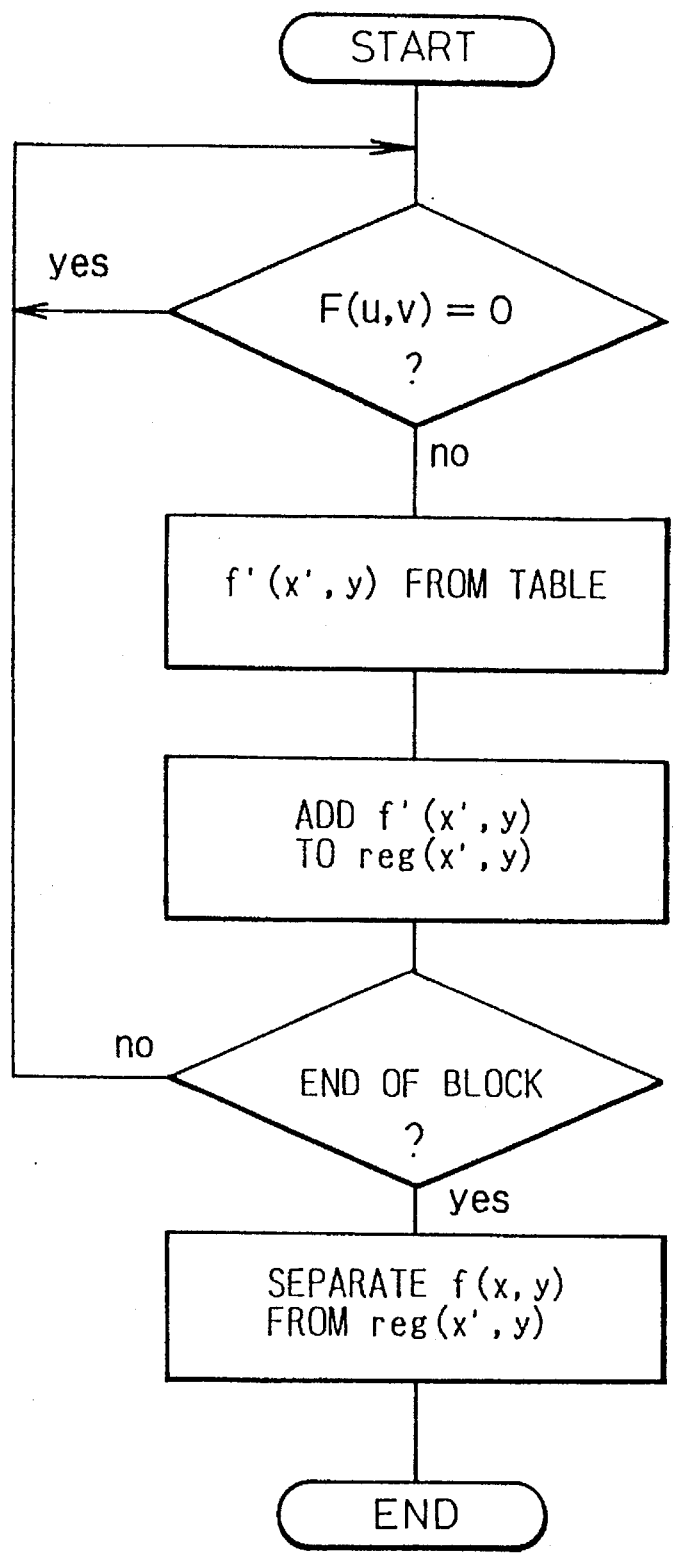
FIG. 15 is a flowchart showing the operation of the apparatus of FIG. 14.

FIG. 14 shows an I-DCT apparatus according to still another embodiment of the present invention, and FIG. 15 shows the operation thereof. The I-DCT apparatus of FIGS. 14 and 15 corresponds to that of FIGS. 9 and 10 except the process that is carried out when values for F(u, v) are not found in the I-DCT table 28. Accordingly, the embodiment of FIGS. 14 and 15 is the same as the embodiment of FIG. 9 when the switches SW1 and SW1' of FIG. 9 are fixed to the lower contacts. The embodiment of FIGS. 14 and 15 is applicable when a value for a quantizer is limited so that the number of coefficients to occur is small and all of the coefficients are stored in the I-DCT table 28.

Figure 16:
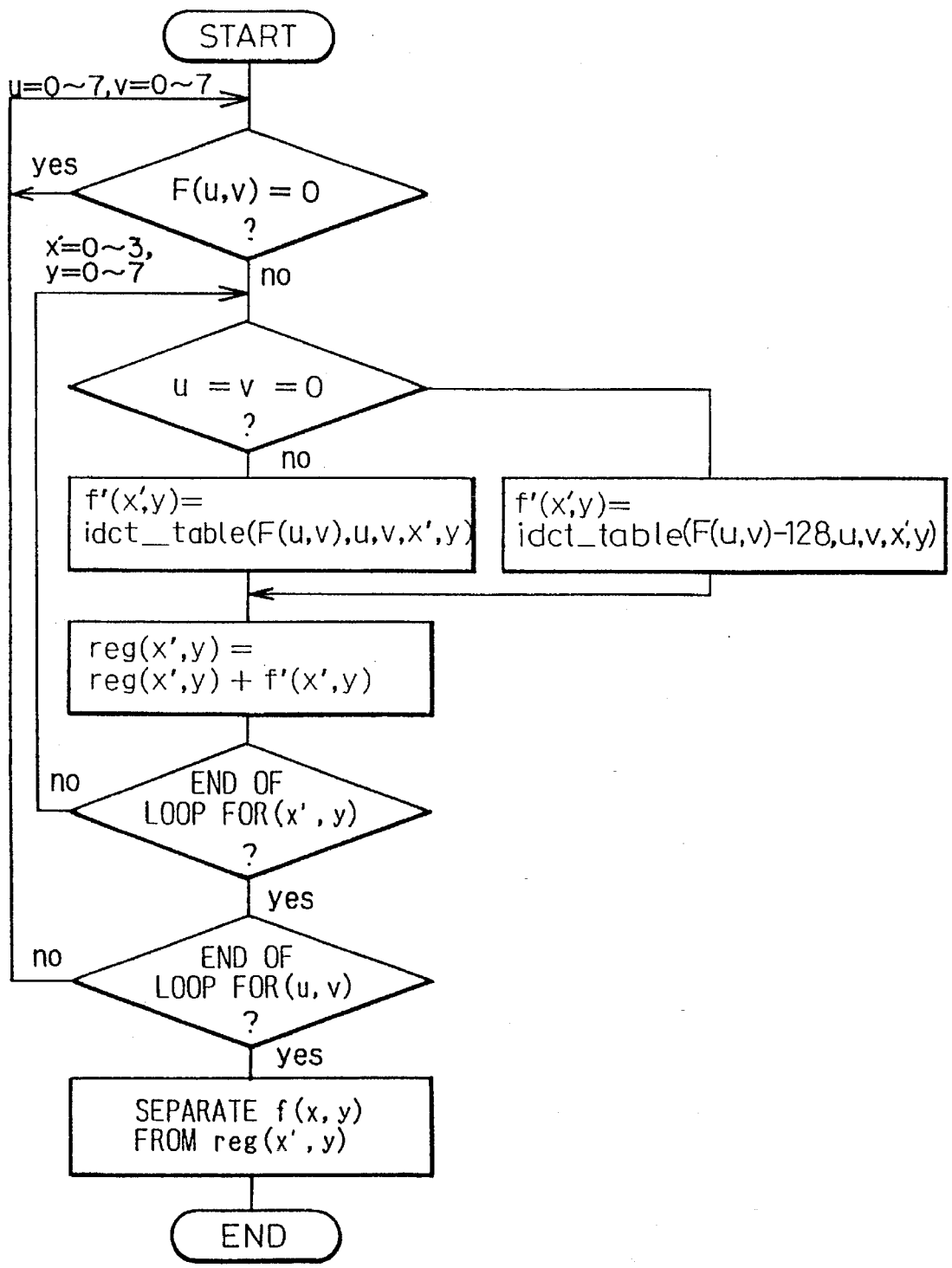
FIG. 16 is a flowchart showing the operation of still another MPEG decoder according to the present invention.

FIG. 16 is a flowchart showing the operation of the MPEG decoder of FIG. 3 employing the embodiment of FIGS. 14 and 15. For the sake of simplicity of explanation, this example restores only I images and employs a quantizer that uses only 8.

The data structures of the table and reg(x', y) are the same as those of FIG. 11. An I-DCT operation is carried out with 13-bit fixed-point accuracy (with two bits being below a decimal point).

A table idct_table (level, u, v, x', y) is defined as follows:

$$idct\_table(level, u, v, x', y)=int(f_{u,v}(coef, 2x', y)\times4)\&0x1fff<<19|int(f_{u,v}(coef, 2x'+1, y)\times4)\&0x1fff$$

where $0\leq x'\leq 3$, $0\leq u, v, y\leq 7$, and $-128\leq level\leq 127$.

The coef is obtained from level, u, and v as follows:
When u=v=0:
coef=(level+128)*8

Other cases:

$$coef0=(2*8*level*intra\_q\_matrix(u, v))/16$$

if (coef is even and coef>0)

then coef=coef0−1 else if (coef is even and coef<0)

then coef=coef0+1 else coef=coef0 where intra_q_matrix(u, v) is an intra-macrobook quantization matrix specified by MPEG.

The size of the table is (the number of values of u)× (the number of values of v)×(the number of values of x')×(the number of values of y)×(the number of values of level 1)×(the number of bytes in one word=4)=2097152 bytes.

This size of table is realizable in a personal computer. Since the quantizer is limited to 8, this table contains all the coefficients that can occur.

Except u=v=0, the process of finding coef from level is completely equal to the inverse quantization process specified by MPEG. Accordingly, the inverse quantizer 24 of FIG. 3 actually carries out no process and provides a level decoded by the variable length decoder 22 as it is as F(u, v) to the I-DCT unit 26. According to the F(u, v), the I-DCT unit 26 looks up the table idct_table. When u=v=0, the table is looked up according to level−128. Data separation is the same as that of FIG. 11.

In the I-DCT apparatuses according to the embodiments mentioned above, the zero coefficient detector 10 determines whether or not a given DCT coefficient is zero, and carries out the following processes only on a non-zero DCT coefficient. An image encoder specified by ITU-T Recommendation H.261 or MPEG gives numbers to quantized DCT coefficients for two-dimensional spatial frequencies in a zigzag manner on a two dimensional plane, and transform them into a sequence of one-dimensional numbers. The sequence is encoded into a set of a zero run length and the level of a non-zero DCT coefficient following the zero run length. Instead of the zero coefficient detector 10 to determine whether or not a given coefficient is zero, it is possible to successively add zero run lengths to determine two-dimensional spatial frequencies u and v, to directly determine non-zero coefficients F(u, v).

Figure 17:
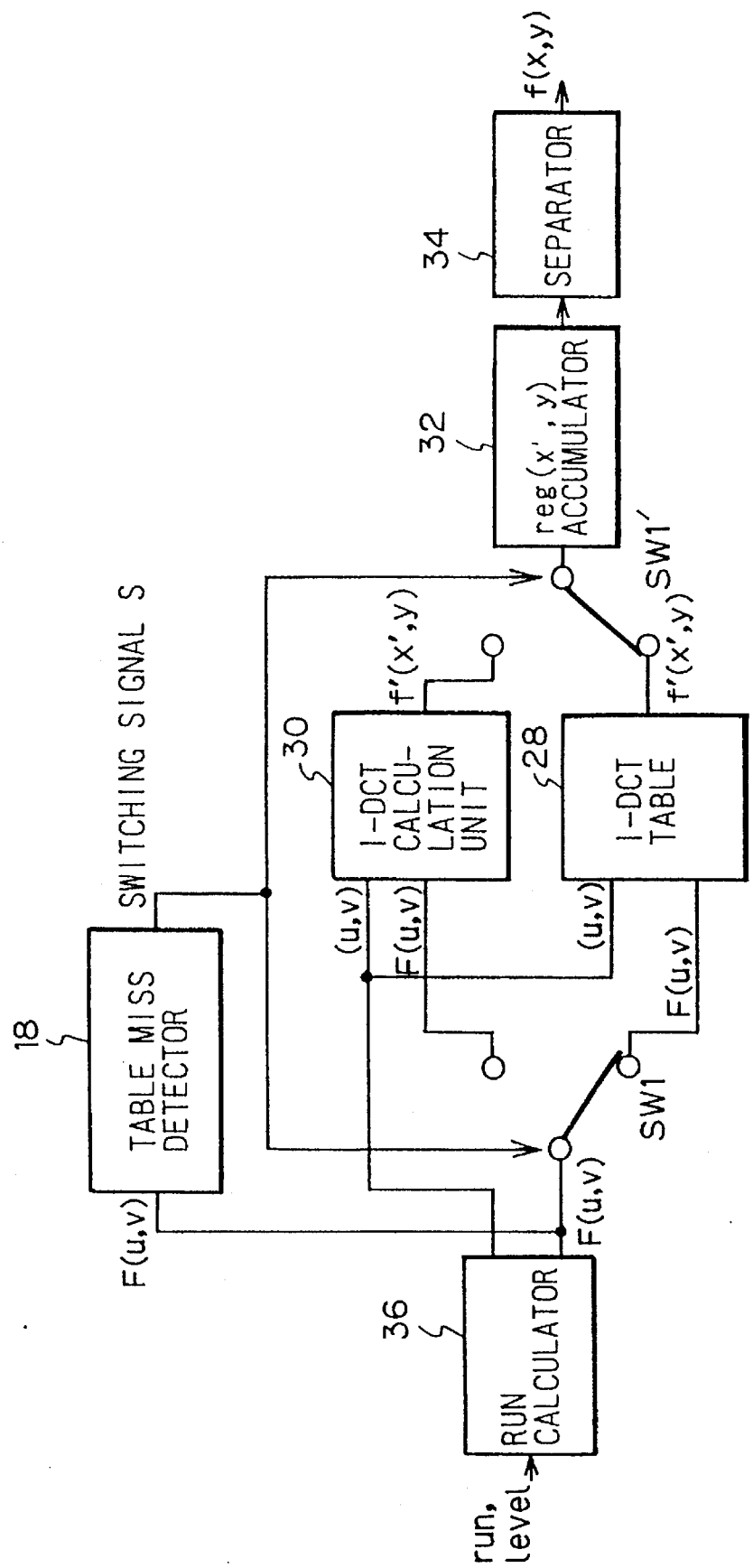
FIG. 17 is a block diagram showing an I-DCT apparatus according to still another embodiment of the present invention.
Figure 18:
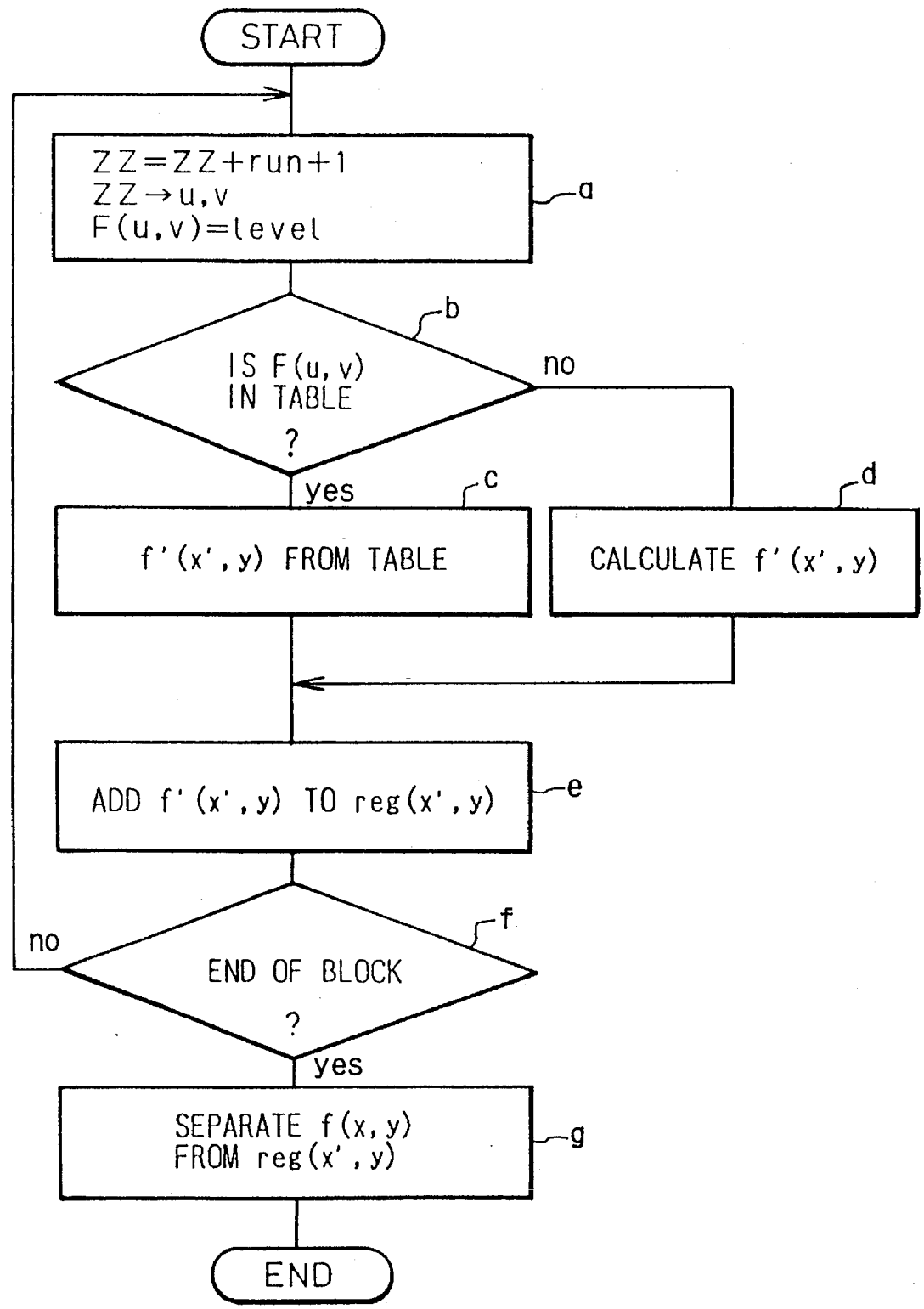
FIG. 18 is a flowchart showing the operation of the apparatus of FIG. 17.
Figure 19:
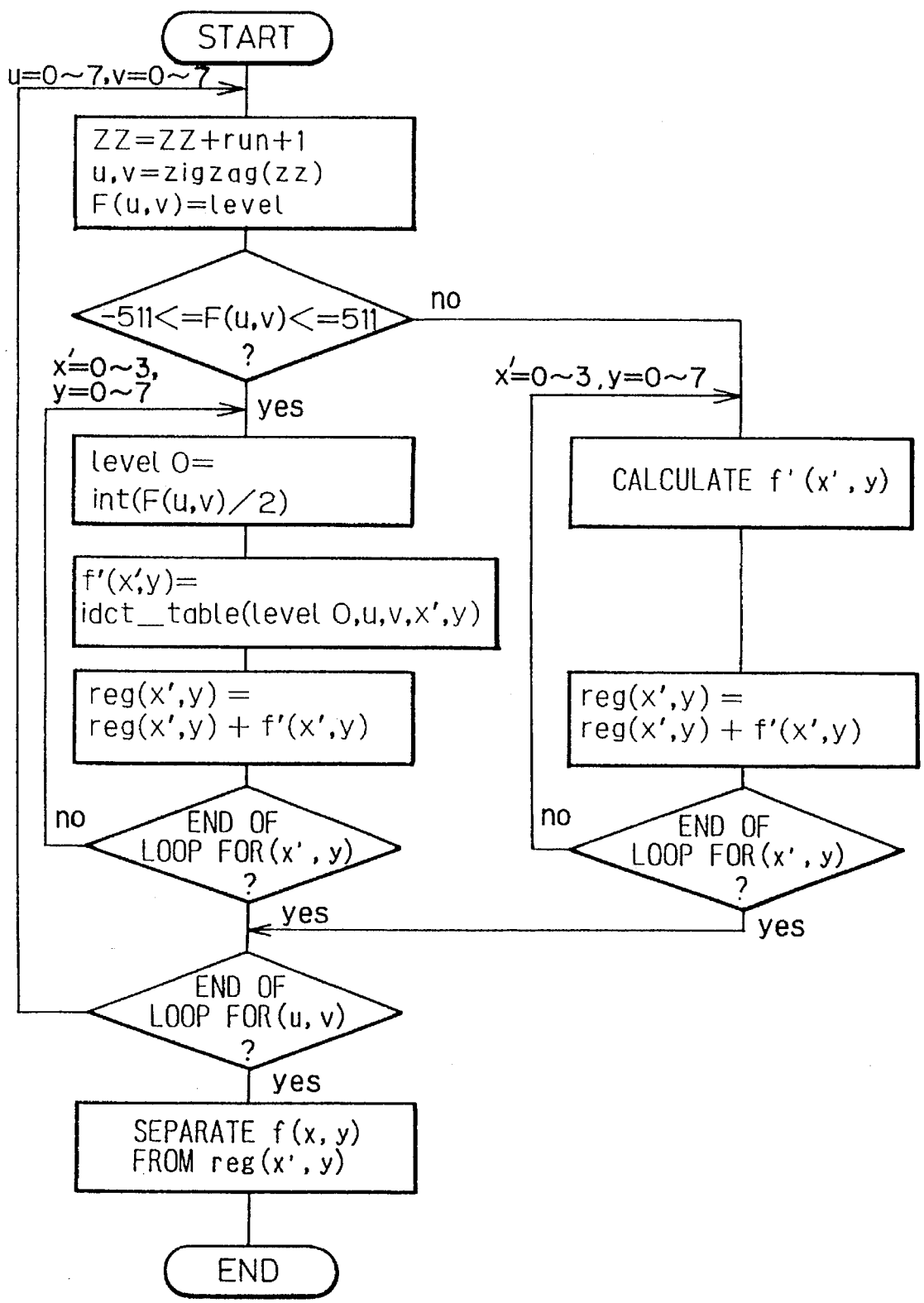
FIG. 19 is a flowchart showing the operation of still another MPEG decoder according to the present invention.

FIG. 17 shows an I-DCT apparatus according to still another embodiment of the present invention employing the idea mentioned above, and FIG. 18 shows the operation thereof. FIG. 19 shows the MPEG decoder of FIG. 3 employing the I-DCT apparatus of FIG. 17. The apparatus of FIG. 17 differs from the apparatus of FIG. 9 in that it has a run calculator 36 instead of the zero coefficient detector 10. The flowchart of FIG. 18 differs from that of FIG. 10 in that step a determines non-zero coefficients F(u, v) and corresponding u and v according to "run" and "level" instead of determining whether or not F(u, v) is zero. In FIG. 18, ZZ is the position of a given coefficient in a zigzag scan and is converted into u and v. The flowchart of FIG. 19 differs from that of FIG. 11 in that it determines F(u, v) and corresponding u and v according to "run" and "level" instead of determining whether or not F(u, v) is zero. In FIG. 19, zigzag( ) is a function for calculating u and v according to a zigzag scan position. This may be realized by table or logic.

Figure 20:
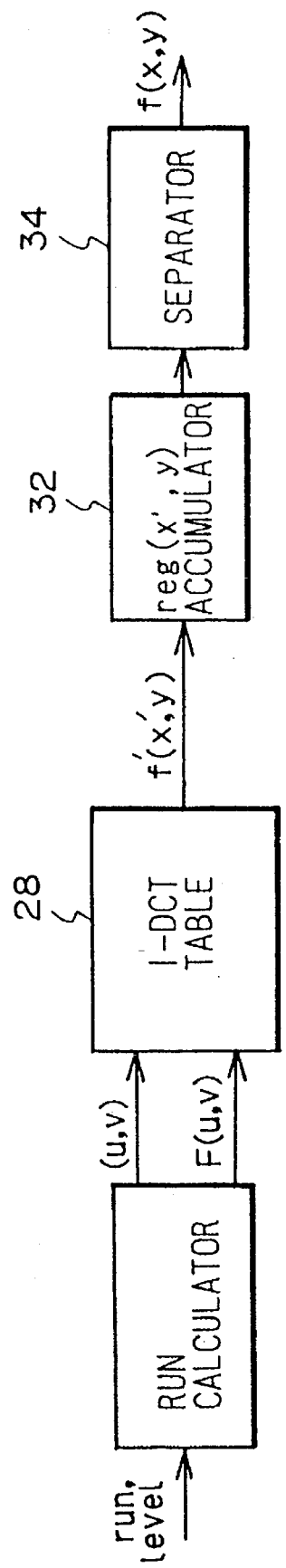
FIG. 20 is a block diagram showing an I-DCT apparatus according to still another embodiment of the present invention.
Figure 21:
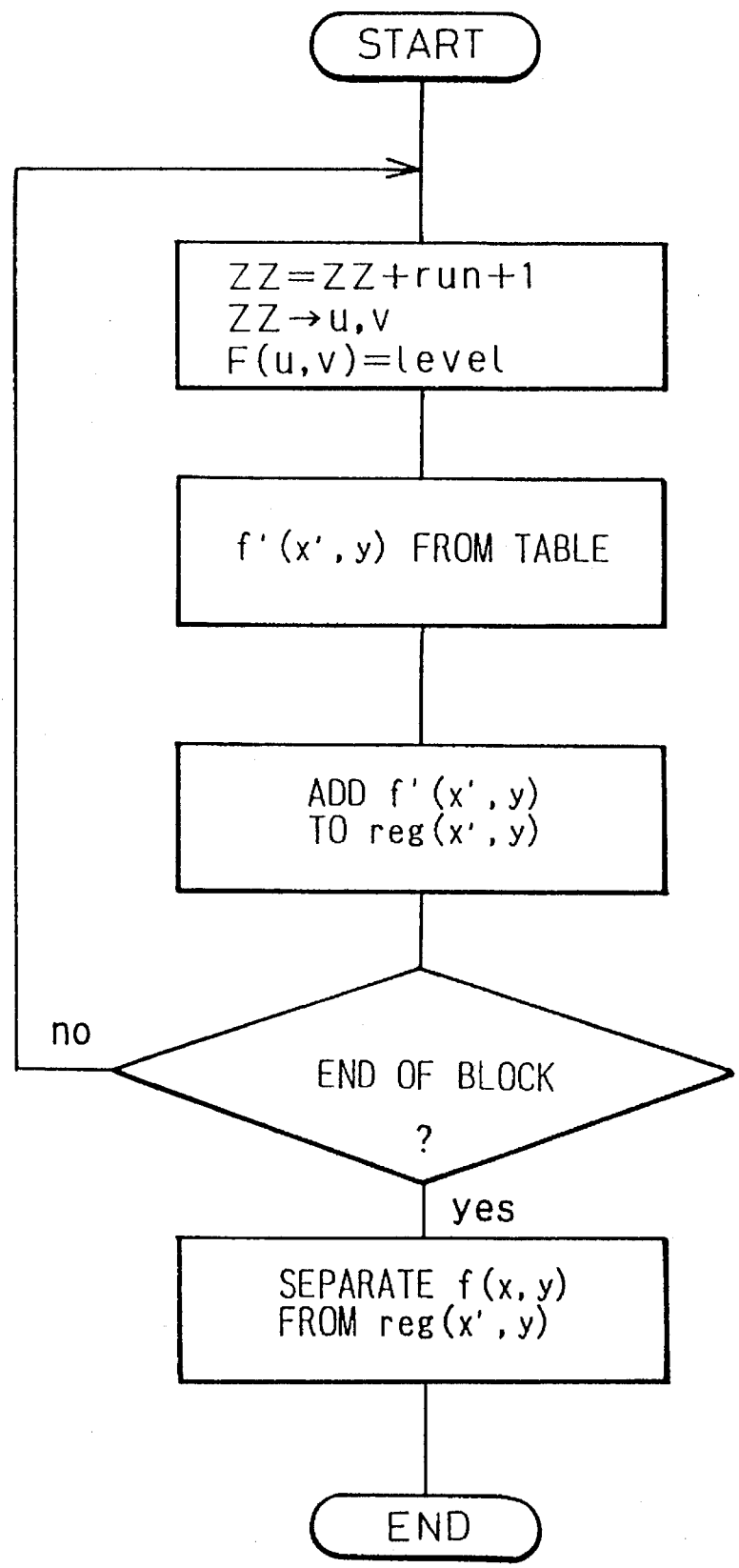
FIG. 21 is a flowchart showing the operation of the apparatus of FIG. 20.
Figure 22:
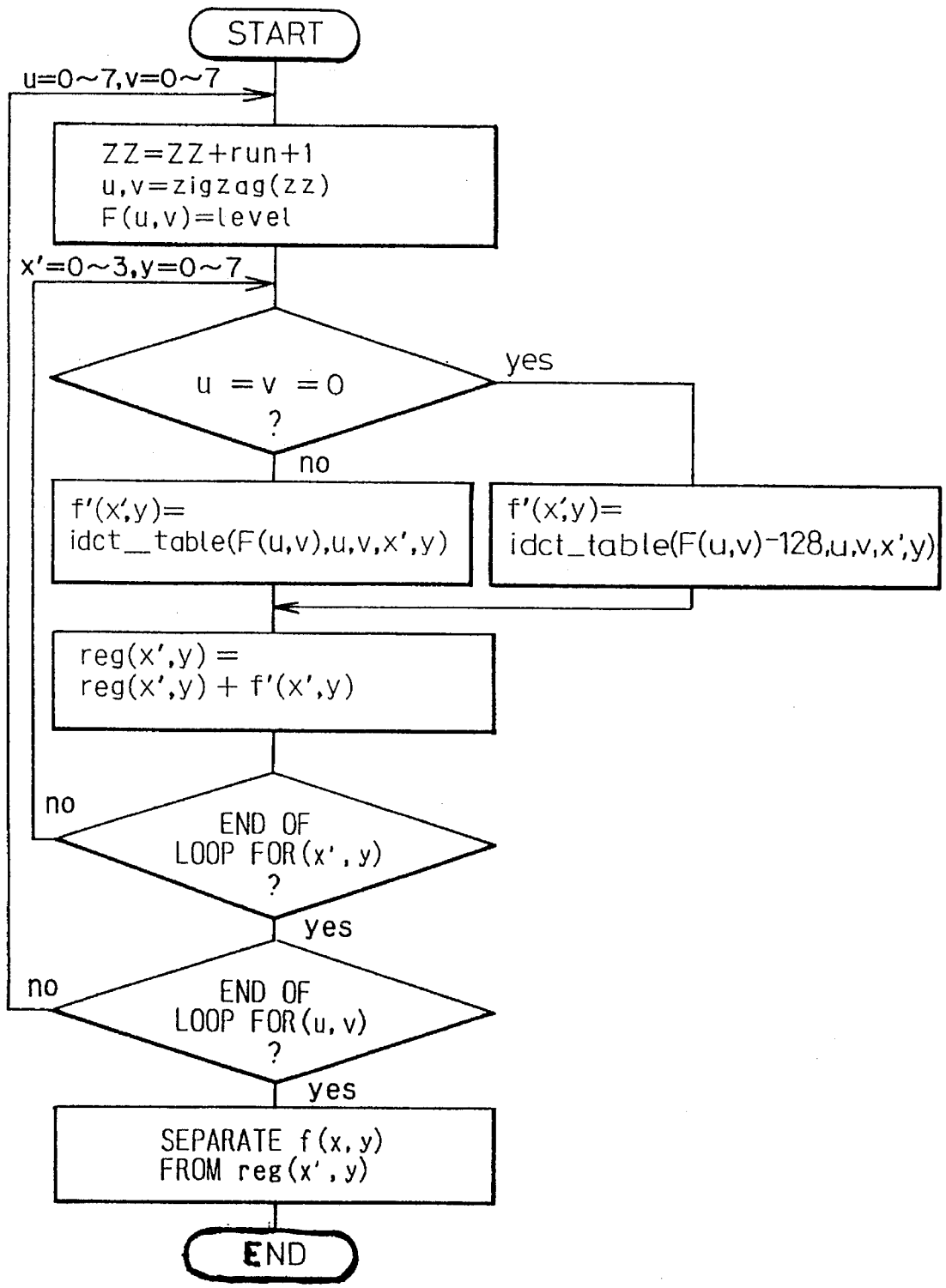
FIG. 22 is a flowchart showing the operation of still another MPEG decoder according to the present invention.

FIG. 20 shows an I-DCT apparatus according to still another embodiment of the present invention employing the idea mentioned above, FIG. 21 shows the operation thereof, and FIG. 22 shows the MPEG decoder of FIG. 3 employing the I-DCT apparatus of FIG. 20. FIG. 20 differs from FIG. 14 in that it employs a run calculator 36 instead of the zero coefficient detector 10 of FIG. 14. FIG. 21 differs from FIG. 15 in that step a determines a non-zero coefficient F(u, v) and corresponding u and v according to "run" and "level" instead of determining whether or not F(u, v) is zero. In FIG. 21, ZZ is the position of a coefficient in a zigzag scan and is converted into u and v. FIG. 22 differs from FIG. 16 in that F(u, v) and corresponding u and v are determined according to "run" and "level" instead of determining whether or not F(u, v) is zero. In FIG. 22, zigzag( ) is a function for calculating u and v according to a zigzag scan position. This is realized by table or logic.

The idea of directly determining F(u, v) according to combinations of zero run lengths and levels is applicable to the I-DCT apparatuses of FIGS. 1 to 5.

Although the present invention explained above relates to I-DCT apparatuses, the present invention is also applicable to a DCT operation carried out on image data having like characteristics and a transform operation carried out on functions having like characteristics.

We claim:

1. A function transform apparatus for transforming a first function in the domain of first variables into a second function in the domain of second variables, comprising:

a memory for storing a plurality of intermediate values corresponding to combinations of non-zero values of the first function, values of the first variables, and values of the second variables;

means for determining whether or not a given value of the first function is zero;

means for reading, out of the memory, intermediate values corresponding to combinations including the value of the first function that has been determined to be not zero and corresponding values of the first variables; and an accumulator for accumulating the read intermediate values with respect to each of values of the second variables, to provide values of the second function for the values of the second variables, respectively.

2. The apparatus as claimed in claim 1, wherein the first variables are two-dimensional frequency variables, the second variables are two-dimensional positional variables, the first function represents the two-dimensional discrete cosine transform of an image, the second function represents the image, each value of the first function is a DCT coefficient, and each value of the second function is a pixel value.

3. The apparatus as claimed in claim 2, further comprising:

means for determining whether or not the memory stores intermediate values corresponding to a DCT coefficient that has been determined to be not zero; and means for calculating, if the memory does not store the intermediate values, the intermediate values from the DCT coefficient, corresponding values of the two-dimensional frequency variables, and values of the two-dimensional positional variables and supplying the intermediate values to the accumulator.

4. The apparatus as claimed in claim 1, wherein each word in the memory stores a plurality of intermediate values corresponding to the same values of the first function and first variables and different values of the second variables, and wherein a buffer area of predetermined length is arranged between adjacent ones of the intermediate values in each word in the memory;

the memory read means reads the intermediate values out of the memory word by word; and the accumulator accumulates the intermediate values word by word, and further comprising:

means for separating the accumulated results into a plurality of values of the second variables.

5. The apparatus as claimed in claim 4, wherein the first variables are two-dimensional frequency variables, the second variables are two-dimensional positional variables, the first function represents the two-dimensional discrete cosine transform of an image, the second function represents the image, each value of the first function is a DCT coefficient, and each value of the second function is a pixel value.

6. The apparatus as claimed in claim 5, further comprising:

means for determining whether or not the memory stores intermediate values corresponding to a DCT coefficient that has been determined to be not zero;

means for calculating, if the memory does not store them, the intermediate values from the DCT coefficient, corresponding values of the two-dimensional frequency variables, and values of the two-dimensional positional variables; and means for combining a plurality of the calculated intermediate values into a word and supplying the word to the accumulator.

7. A function transform apparatus for decoding an image encoded by two-dimensional discrete cosine transform, the encoded image including combinations of non-zero DCT coefficients and zero run lengths, comprising:

a memory for storing a plurality of intermediate values corresponding to combinations of non-zero DCT coefficients, values of two-dimensional frequency variables, and values of two-dimensional positional variables;

means for finding values of the two-dimensional frequency variables corresponding to an input DCT coefficient according to an input zero run length;

means for reading, out of the memory, intermediate values corresponding to combinations including the found values of the two-dimensional frequency variables and the DCT coefficient; and an accumulator for accumulating the read intermediate values with respect to each of values of the two-dimensional positional variables, to provide pixel values corresponding to the values of the two-dimensional positional variables.

8. The apparatus as claimed in claim 7 further comprising:

means for determining whether or not the memory stores intermediate values related to the input DCT coefficient; and means for calculating, if the memory does not store them, the intermediate values from the DCT coefficient, corresponding values of the two-dimensional frequency variables, and values of the two-dimensional positional variables and supplying the intermediate values to the accumulator.

9. The apparatus as claimed in claim 7, wherein each word in the memory stores a plurality of intermediate values corresponding to the same DCT coefficient, the same values of the two-dimensional frequency valuables, and different values of the two-dimensional positional variables, and wherein a buffer area of predetermined length is arranged between adjacent ones of the intermediate values in each word in the memory;

the memory read means reads the intermediate values out of the memory word by word; and the accumulator accumulates the calculation results word by word, and further comprising:

means for separating the accumulated results into a plurality of the values of the two-dimensional positional variables.

10. The apparatus as claimed in claim 9, further comprising:

means for determining whether or not the memory stores intermediate values related to the input DCT coefficient;

means for calculating, if the memory does not store them, the intermediate values from the DCT coefficient, corresponding values of the two-dimensional frequency variables, and values of the two-dimensional positional variables; and means for combining a plurality of the calculated intermediate values into a word and supplying the word to the accumulator.

* * * * *